Patented Dec. 2, 1947

2,432,032

UNITED STATES PATENT OFFICE 2,432,032

PRODUCTION OF GLYCEROL BY FERMENTATION

Arthur Charles Neish, George Aleck Ledingham, and Allister Clark Blackwood, Ottawa, Ontario, Canada, assignors to Honorary Advisory Council for Scientific and Industrial Research, Ottawa, Ontario, Canada, a corporation of Canada No Drawing. Application February 27, 1946, Serial No. 650,754

6 Claims. (Cl. 195—43)

This invention relates to the production of glycerol by fermentation.

The object of the invention is to provide a method of fermenting sugars whereby a maximum yield of glycerol may be obtained.

It has been found that when sugars are fermented with *Bacillus subtilis* (Ford's type) under closely controlled conditions substantial yields of glycerol are obtained along with 2,3 butanediol and other products. The medium is maintained within a pH range of 5.5 to 7.0 and preferably 5.8 to 6.2. The medium contains a large amount of sugar relative to protein, preferably ten times as much sugar as protein, although the ratio of sugar to protein can be varied quite widely. This ratio should not be too low because then the pH goes up and the production of glycerol stops. Ratios of from about 5 or so upwards are useful. Too low a proportion of protein results in very slow fermentation of the sugar. Free oxygen in the fermentation solution is avoided.

The following example illustrates the method.

To a 5% aqueous solution of glucose, fructose, sucrose or invert sugar 0.5% of a nutrient, such as yeast extract or malt sprouts and about 0.1% of nutrient mineral salts were added. Potassium hydrogen phosphate and magnesium sulphate were used as mineral nutrients. The solution was sterilized by treatment with steam at 15 pounds' pressure for 15 minutes. 1% of sterile powdered calcium carbonate was added and the solution was inoculated with a selected strain of *Bacillus subtilis* (Ford's type), care being taken to prevent contamination with other organisms. The inoculated medium was maintained at a temperature of 30 to 50° C., preferably 37° C., until all the sugar was fermented. During this time the calcium carbonate was maintained uniformly suspended throughout the medium by stirring or agitation. This uniformly maintained the pH at the preferred level. The products produced were as follows:

| Product | lbs. per 100 lbs. of sugar |
| --- | --- |
| Glycerol | 29.4 |
| 2,3 Butanediol | 28.1 |
| Lactic Acid | 11.6 |
| Ethanol | 2.2 |
| Formic Acid | 0.3 |
| Carbon Dioxide | 36.4 |

The glycerol may be separated from the other products of the fermentation in any desired known way.

The *Bacillus subtilis* (Ford's type) organism is well known and can be easily isolated from soil or hay by standard bacteriological procedures. Some of the strains of this type of organism isolated by applicants are particularly effective in the production of high yields of glycerol in dilute aqueous solutions of sugar in the manner described.

The addition of nutrient mineral salts is not necessary when the protein nutrient contains sufficient of them as is frequently the case. It is important to maintain the fermenting solution substantially free from free oxygen. The evolution of carbon dioxide both from the calcium carbonate uniformly suspended in the solution and from the fermenting sugar acts to resist the entry of air to the fermenting solution.

The pH of the fermenting solution may be maintained in other ways, as by adding ammonium or alkalis in controlled proportions.

What we claim is:

1. A method of producing glycerol which comprises fermenting aqueous sugar solution containing nitrogenous nutrient maintained at a pH of 5.5 to 7.0 with *Bacillus subtilis* Ford's type.

2. A method of producing glycerol which comprises sterilizing an aqueous sugar solution containing a relatively small amount of protein nutrient with steam, inoculating the medium with *Bacillus subtilis* Ford's type, and maintaining the medium at a pH of 5.5 to 7.0 and at a temperature of 30–50° C.

3. A method as defined in claim 2 wherein calcium carbonate is added to the sterilized solution.

4. A method as defined in claim 2 wherein the sterilized solution contains substantially ten times as much sugar as protein.

5. A method of producing glycerol which comprises fermenting with *Bacillus subtilis* Ford's type a sterile dilute aqueous sugar solution maintained at a pH of 5.5 to 7.0 and at a temperature of about 37° C.

6. A method of fermentation which comprises adding a protein-containing nutrient to an aqueous solution containing about 5% of sugar to provide a medium containing substantially ten times as much sugar as protein, sterilizing the medium with steam, adding substantially 1% of sterile finely divided calcium carbonate to the medium, inoculating the medium with *Bacillus* subtilis Ford's type, maintaining the medium at a temperature of 30 to 40° C. and agitating the medium to maintain uniformity therein, and a pH of 5.8 to 6.2.

ARTHUR CHARLES NEISH.
GEORGE ALECK LEDINGHAM.
ALLISTER CLARK BLACKWOOD.

REFERENCES CITED

The following references are of record in the file of this patent:

UNITED STATES PATENTS

| Number | Name | Date |
| --- | --- | --- |
| 2,344,025 | Christensen | Mar. 14, 1944 |
| 1,990,908 | Krug | May 4, 1932 |

OTHER REFERENCES

Science, vol. 101, page 245 (March 31, 1945).